(12) United States Patent
Lawson et al.

(10) Patent No.: US 7,677,502 B2
(45) Date of Patent: Mar. 16, 2010

(54) METHOD AND APPARATUS FOR GENERATING LIFT

(75) Inventors: Edward L. Lawson, Long Beach, CA (US); Christopher K. Droney, Huntinton Beach, CA (US); Darold B. Cummings, Hawthorne, CA (US)

(73) Assignee: The Boeing Company, Chicago, IL (US)

( * ) Notice: Subject to any disclaimer, the term of this patent is extended or adjusted under 35 U.S.C. 154(b) by 733 days.

(21) Appl. No.: 11/238,347

(22) Filed: Sep. 29, 2005

(65) Prior Publication Data

US 2007/0069066 A1 Mar. 29, 2007

(51) Int. Cl.
*B64C 3/50* (2006.01)
*B64D 27/00* (2006.01)

(52) U.S. Cl. .................... 244/207; 244/215; 244/55; 244/58

(58) Field of Classification Search .................. None
See application file for complete search history.

(56) References Cited

U.S. PATENT DOCUMENTS

| | | | | | |
|---|---|---|---|---|---|
| 2,843,340 | A | * | 7/1958 | Wibault | 244/23 R |
| 2,939,649 | A | * | 6/1960 | Shaw | 244/12.3 |
| 2,940,689 | A | * | 6/1960 | Howell | 244/12.3 |
| 2,955,780 | A | * | 10/1960 | Hulbert | 244/23 R |
| 2,990,138 | A | * | 6/1961 | Shaw | 244/12.3 |
| 3,018,034 | A | * | 1/1962 | Ferri | 60/269 |
| 3,033,492 | A | * | 5/1962 | Rowe | 244/23 R |
| 3,061,243 | A | * | 10/1962 | Simon | 244/23 B |
| 3,087,691 | A | * | 4/1963 | Rainbow | 244/23 B |
| 3,095,164 | A | * | 6/1963 | Collier | 244/12.3 |
| 3,095,165 | A | * | 6/1963 | Rowe | 244/12.3 |
| 3,124,323 | A | * | 3/1964 | Frost | 244/12.2 |
| 3,146,590 | A | * | 9/1964 | Erwin | 60/39.17 |
| 3,154,917 | A | * | 11/1964 | Williamson | 415/50 |
| 3,159,363 | A | * | 12/1964 | Stewart | 244/52 |
| 3,161,374 | A | * | 12/1964 | Allred et al. | 244/12.3 |
| 3,176,934 | A | * | 4/1965 | Kappus | 244/12.3 |
| 3,179,353 | A | * | 4/1965 | Peterson | 244/12.3 |
| 3,263,416 | A | * | 8/1966 | Arthur et al. | 60/226.1 |
| 3,267,667 | A | * | 8/1966 | Erwin | 60/226.1 |
| 3,273,339 | A | * | 9/1966 | Borysthen-Tkacz | 60/229 |
| 3,312,424 | A | * | 4/1967 | Kappus | 244/12.5 |
| 3,335,976 | A | * | 8/1967 | Kappus | 244/12.3 |
| 3,383,074 | A | * | 5/1968 | Coplin | 244/55 |
| 3,448,945 | A | * | 6/1969 | Ascani, Jr. | 244/12.3 |
| 3,468,394 | A | * | 9/1969 | Winter | 180/117 |
| 3,674,224 | A | * | 7/1972 | Konecny et al. | 244/12.3 |
| 3,748,854 | A | * | 7/1973 | Vedova | 60/226.1 |
| 3,783,618 | A | * | 1/1974 | Kawamura | 60/226.1 |
| 3,820,746 | A | * | 6/1974 | Vedova | 244/55 |
| 3,831,884 | A | * | 8/1974 | Schellin | 244/12.2 |
| 3,972,490 | A | * | 8/1976 | Zimmermann et al. | 244/12.3 |
| 4,022,405 | A | * | 5/1977 | Peterson | 244/12.3 |
| 4,958,489 | A | * | 9/1990 | Simmons | 60/226.3 |
| 5,102,066 | A | * | 4/1992 | Daniel | 244/12.1 |
| 5,275,356 | A | * | 1/1994 | Bollinger et al. | 244/12.3 |
| 5,312,069 | A | * | 5/1994 | Bollinger et al. | 244/12.3 |

(Continued)

*Primary Examiner*—Tien Dinh
*Assistant Examiner*—Joseph W Sanderson

(57) ABSTRACT

A method of generating lift for a vehicle including heating a flow of gas using a gas generator mounted on the vehicle that contributes no more than about ten percent of thrust used to propel the vehicle in a forward direction, and driving a lift fan using the heated gas flow to generate lift for the vehicle.

23 Claims, 3 Drawing Sheets

U.S. PATENT DOCUMENTS

| | | | |
|---|---|---|---|
| 5,328,131 A * | 7/1994 | Fodera et al. | 244/12.2 |
| 5,503,351 A * | 4/1996 | Vass | 244/34 A |
| 6,629,670 B1 * | 10/2003 | Shah | 244/12.3 |
| 2007/0252032 A1 * | 11/2007 | Lawson et al. | 244/12.3 |

* cited by examiner

METHOD AND APPARATUS FOR GENERATING LIFT

BACKGROUND OF THE INVENTION

The present invention relates generally to vehicles, and more specifically to a method and apparatus for generating lift for a vehicle.

Some aircraft include short take-off and landing (STOL) technology to allow the aircraft to take-off from, and land on, conventionally short and/or damaged runways. STOL technology may include mechanical devices such as flaps and slats, and/or powered lifts systems such as internally blown flap (IBF), upper surface blowing (USB), externally blown flap (EBF), augmentor wing, and vectored thrust systems. Systems such as IBF, USB, and EBF often use engine bleed air or diverted exhaust gases to increase or amplify localized lift generated by the wings. However, the amount of gasflow required by IBF, USB, and EBF systems can place significant demands on aircraft engines. A larger engine, which provides inferior cruise performance, may be needed to accommodate the gas flow requirements of such systems. Furthermore, if an engine becomes inoperable the aircraft may experience a loss of localized lift on a wing adjacent the inoperable engine thereby disrupting an even distribution of lift along the wing.

SUMMARY OF THE INVENTION

In one aspect, a method is provided of generating lift for a vehicle. The method includes heating a flow of gas using a gas generator mounted on the vehicle contributing no more than about ten percent of thrust used to propel the vehicle in a forward direction, and driving a lift fan using the heated gas flow to generate lift for the vehicle.

In another aspect, the present invention includes an airframe comprising a body, and a gas generator mounted on the body for heating a flow of gas, wherein the gas generator contributes no more than about ten percent of thrust used to propel the body in a forward direction. The airframe also includes a lift fan mounted on the body for generating lift for the body, wherein the lift fan is fluidically coupled with the gas generator for driving the lift fan from at least a portion of the heated gas flow.

In yet another aspect, the present invention includes a vehicle comprising a frame, an engine mounted on the frame for propelling the vehicle in a forward direction, and a gas generator mounted on the frame for heating a flow of gas, wherein the gas generator contributes no more than about ten percent of thrust used to propel the vehicle in the forward direction. The vehicle also includes a lift fan mounted on the frame for generating lift for the vehicle, wherein the lift fan is fluidically coupled with the gas generator for driving the lift fan from at least a portion of the heated gas flow.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED

Figure 1:
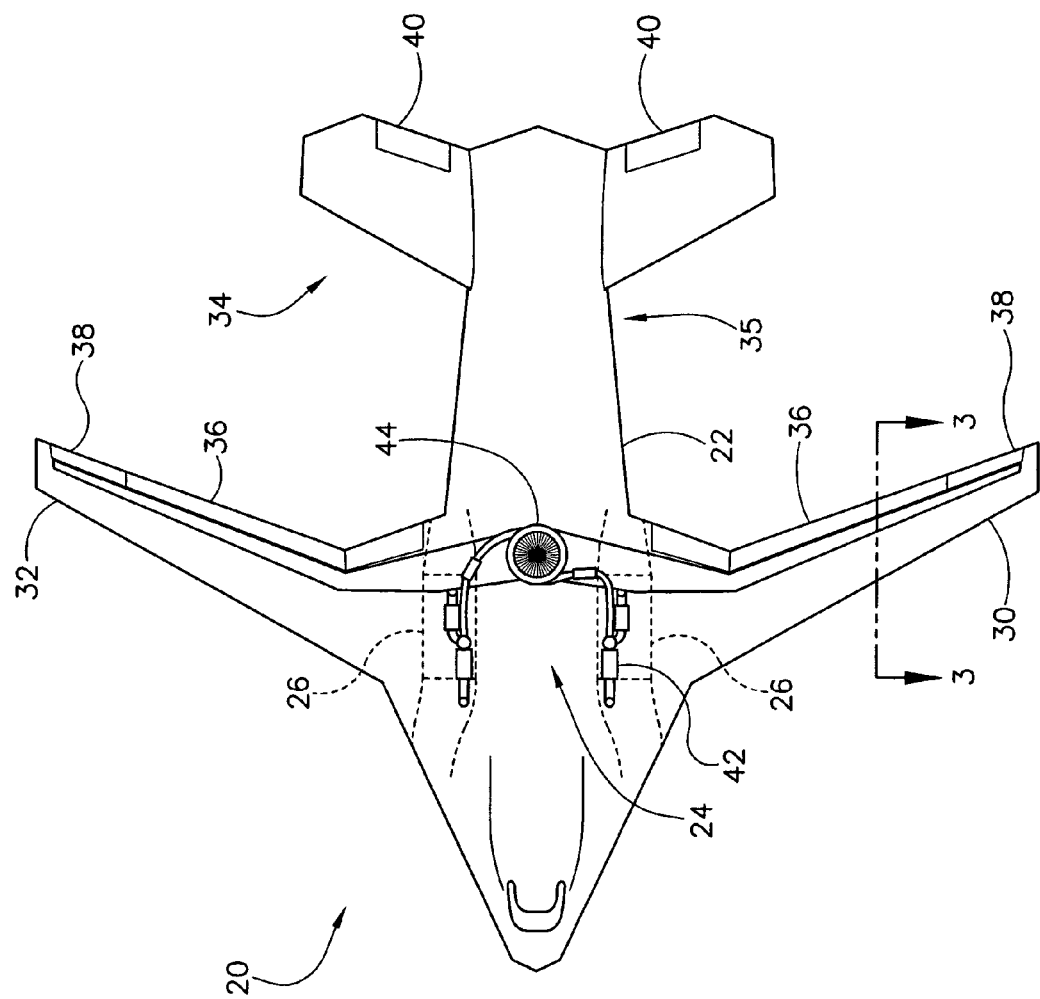
FIG. 1 is a top plan of an aircraft having one embodiment of a lift system of the present invention.

Referring now to the drawings, and more specifically to FIG. 1, an aircraft is designated in its entirety by the reference numeral 20. The aircraft 20 includes an airframe (generally designated by 22), a lift system (generally designated by 24) mounted on the airframe for generating lift for the aircraft, and two engines 26 mounted on the airframe for propelling the aircraft. The airframe 22 includes a fuselage section 28, a pair of wings 30, 32 extending laterally outward from the fuselage, and a tail assembly (generally designated by 34) extending from a rearward end (generally designated by 35) of the fuselage. Each of the wings 30, 32 and the tail assembly 34 include lifting or control surfaces. Specifically, each of the wings 30, 32 has a flap 36 and an aileron 38, and the tail assembly 34 includes elevators 40. The aircraft 20 may have other lifting or control surfaces (not shown) in addition to and/or instead of the flaps 36, the ailerons 38, and/or the elevators 40 without departing from the scope of the present invention. Although the lift system 24 of the present invention may be used with any suitable aircraft without departing from the scope of the present invention, in one embodiment the aircraft 20 is a transport aircraft.

Figure 2:
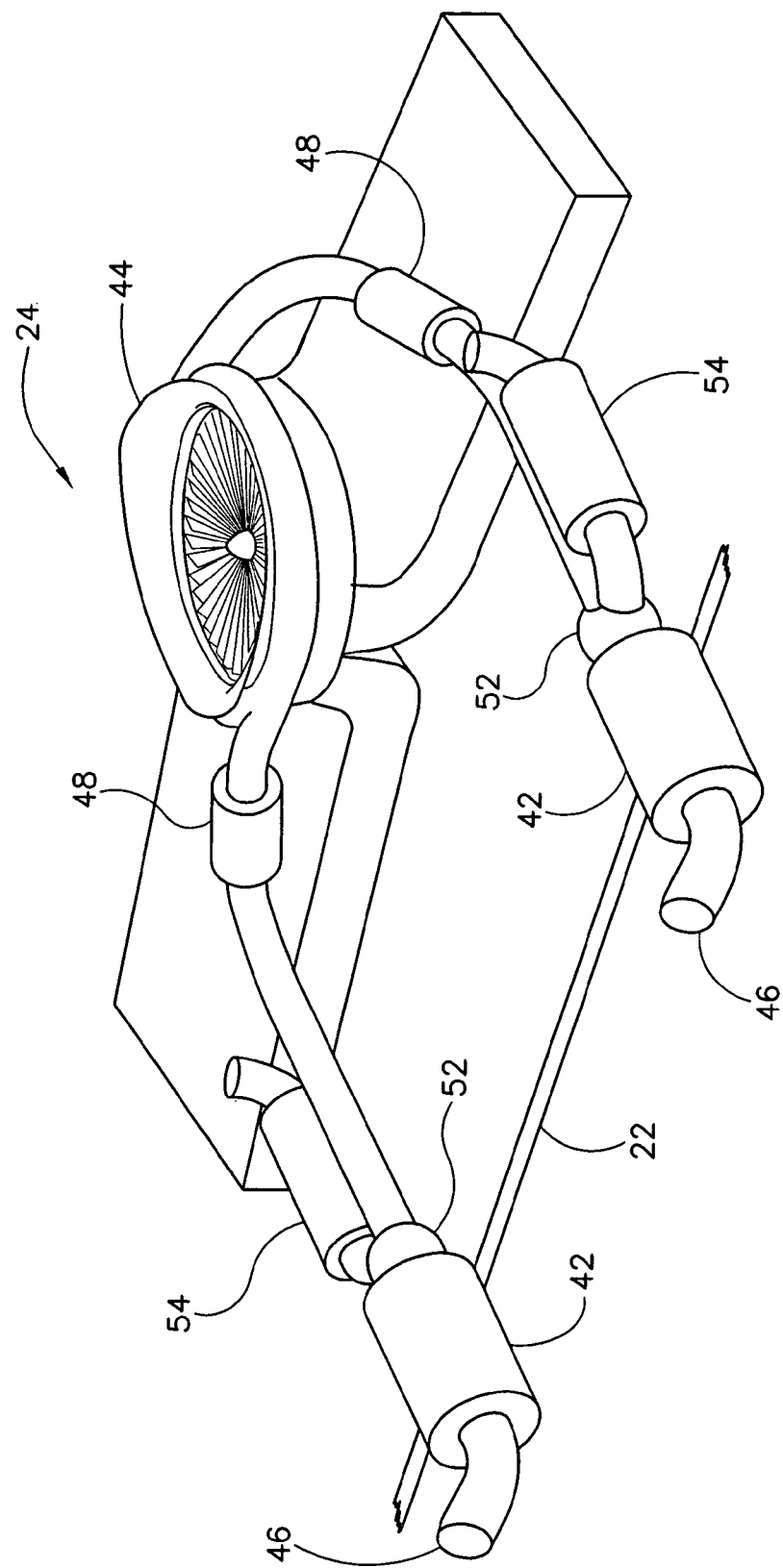
FIG. 2 is a schematic of one embodiment of the lift system of the present invention.

As shown in FIGS. 1 and 2, the lift system 24 includes two gas generators 42 mounted on the airframe 22, and a lift fan 44 mounted on the airframe. Although two gas generators 42 are shown and described herein, the lift system 24 may include any number of gas generators without departing from the scope of the present invention. As shown in FIG. 2, the gas generators 42 receive a flow of gas through an inlet 46. The gas generators 42 compress the received gas, and heat the gas by mixing it with a fuel and igniting the mixture to produce a flow of heated gas. Although other gases may be used without departing from the scope of the present invention, in one embodiment the gas heated by the gas generators 42 is air. As illustrated in FIG. 2, the gas generators 42 may receive gas through the inlet 46 from ambient gas adjacent the aircraft 20 (FIG. 1), from a supply of gas onboard the aircraft such as bleed air from the engines, and/or from any other suitable source. Although other gas generators may be used without departing from the scope of the present invention, in one embodiment the gas generators 42 are auxiliary power units, available from Honeywell International Inc. of Phoenix, Ariz.

As further illustrated in FIG. 2, the flow of heated gas produced by the gas generators 42 is channeled to the lift fan 44 to drive operation thereof. In one embodiment, an augmentor 48 is operably connected between each gas generator 42 and the lift fan 44 to increase energy in the heated gas flow downstream from the gas generators when it is desired to boost the flow of heated gas supplied to the lift fan. Although two augmentors 48 are shown in FIG. 2 and described herein, the lift system 24 may include any number of augmentors without departing from the scope of the present invention.

Although other flow rates may be used without departing from the scope of the present invention, in one embodiment the gas generators 42 (and the augmentors 48 when used to boost the heated gas flow) produce a heated gas flow having a flow rate of between about 20 pounds per second and about 40 pounds per second. As described below, the heated gas flow may be used to drive the lift fan 44 and/or to generate electrical power. Although the generators 42 may produce gas having other temperatures without departing from the scope of the present invention, in one embodiment the gas generators produce gas having a temperature between about 1200 degrees Fahrenheit and about 2000 degrees Fahrenheit. The gas generators 42 may be controlled using a conventional digital controller such as a full authority digital engine controller, available from Honeywell International Inc.

As will be described in more detail below, when supplied to the lift fan 44 the heated gas flow drives the lift fan to move ambient air, which is then directed over a lifting surface of the aircraft 20 to generate lift for the aircraft. Although only one lift fan 44 is shown and described herein, the lift system 24 may include any number of lift fans without departing from the scope of the present invention. Although other types of fans (e.g., a centrifugal compressor) may be used without departing from the scope of the present invention, in one embodiment the lift fan 44 is an axial fan. Although a hub-driven fan may be used without departing from the scope of the present invention, in one embodiment the lift fan 44 is a tip-turbine lift fan wherein the heated gas flow mixes with ambient air moved by the lift fan as the air and heated gas flow exit the lift fan. The lift fan 44 may draw and move air from air adjacent the aircraft 20 and/or from a supply of air onboard the aircraft.

The lift fan 44 and other components of the lift system 24 (e.g., gas generators 42) may be mounted anywhere on the airframe 22 to direct gas (air moved by the fan as well as any heated gas flow mixed therewith) over any portion of any lifting or control surface of the aircraft (whether such lifting or control surface is shown and/or described herein). Generally, the gas directed over the lifting surface is used to generate lift for the aircraft 20, for example to increase an amount of lift available for the aircraft during take-off or landing. However, the gas directed over a control surface may be used to generally increase the effectiveness of the lifting or control surface. For example, gas may be directed over an aileron 38 (FIG. 1) to increase the effectiveness of the aileron during flight. Further, the flow generated by the lift fan 44 may be directed through the airframe 22 using ducts (not shown).

Figure 3:
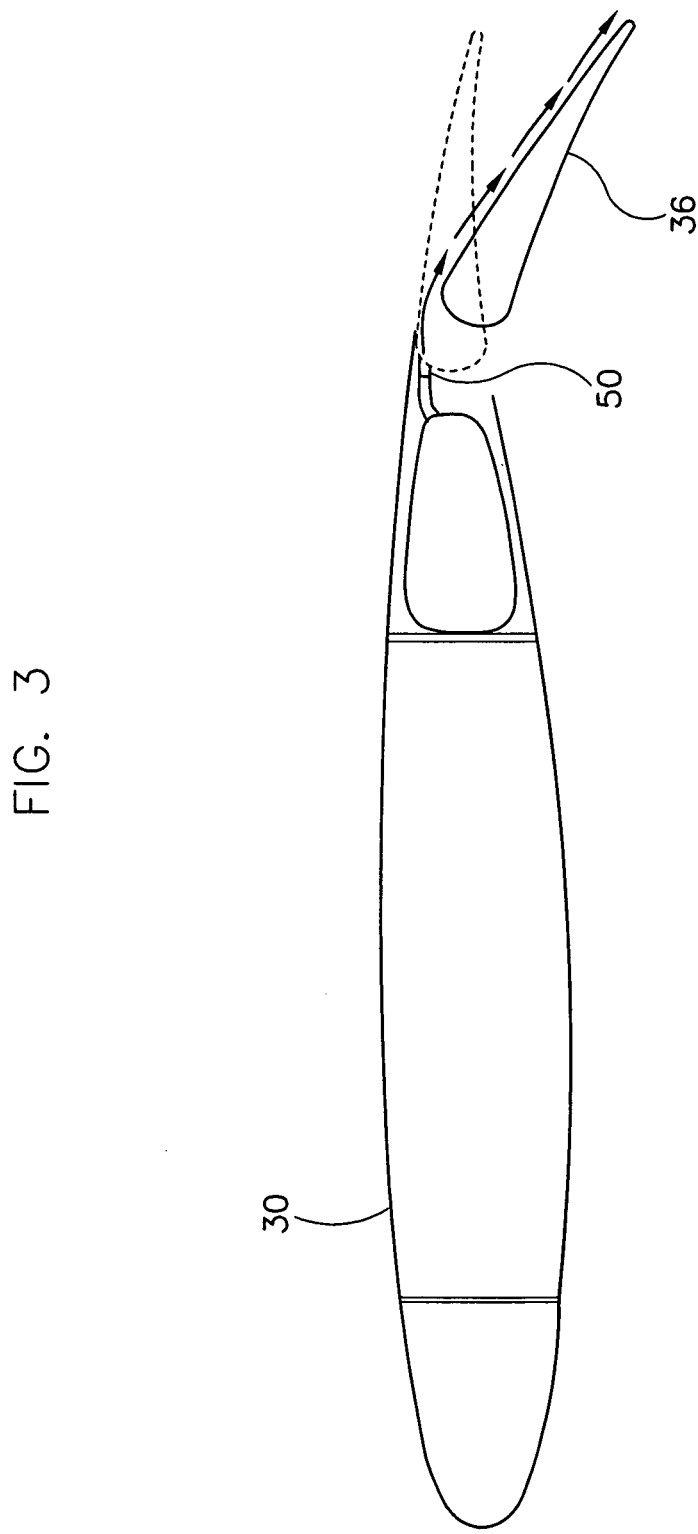
FIG. 3 is a cross section of a wing of the aircraft taken along line 3-3 of FIG. 1.

Although the gas may be moved by the lift fan 44 and directed over a lifting or control surface of the aircraft 20 in any fashion without departing from the scope of the present invention (e.g., upper surface blowing (USB) and externally blown flap (EBF) systems), as shown in the exemplary embodiment of FIG. 3 the lift system 24 is an internally blown flap (IBF) system that directs gas over the lifting or control surface (e.g., flap 36 or aileron 38) from a compartment or plenum within the aircraft 20 (FIG. 1). Specifically, gas exiting the lift fan 44 (FIG. 1) is directed through nozzles 50 positioned adjacent and upstream from the flap 36. By directing gas over the flap 36, an amount of lift generated adjacent the flap is increased, for example to increase an amount of lift available for the aircraft 20 during take-off or landing. Although the gas directed over the flap 36 will provide some forward propulsion to the aircraft 20, no more than ten percent of the thrust used to propel the aircraft 20 in a forward direction is contributed by the lift system 24 (and therefore the gas generators 42, shown in FIGS. 1 and 2). Accordingly, because the engines 26 (FIG. 1) are not used to drive the lift fan 44, the engines 26 need only be sized to provide adequate forward thrust and may therefore be sized for a predetermined cruise efficiency without consideration of the lift system 24. A decrease in the size of the engines 26 may also decrease the overall weight of the engines 26 and lift system 24. Additionally, using the gas generators 42 to drive the lift fan 44 as opposed to the engines 26 may facilitate decreasing a loss of localized lift when an engine 26 fails. The use of gas generators 42 to drive the lift fan 44 may also allow components of the lift system 24 to be positioned in unoccupied areas of the fuselage 28 (FIG. 1). Accordingly, use of the gas generators 42 of the present invention to drive the lift fan 44 may not disrupt aerodynamic properties of the aircraft 20 as compared to a larger or additional engine 26.

In one embodiment, gas exiting the lift fan 44 may be directed (in addition to or in alternative to direction over a lifting or control surface) to an environmental control system (not shown) of the aircraft 20. For example, gas exiting the lift fan 44 may be filtered and used to pressurize a payload bay compartment (not shown) and/or provide an air curtain when a payload bay door (not shown) is open.

As discussed above, the heated gas flow from the gas generators 42 may be used to generate electrical power. As shown in FIG. 2, in one embodiment the lift system 24 includes two diverter valves or diverters 52, each operably connected between a gas generator 42 and the lift fan 44. The diverters 52 are also each operably connected between their respective gas generator 42 and a respective power turbine 54 mounted on the airframe 22 for generating electrical power. The power turbines 54 are each fluidically coupled with a gas generator 42 for receiving heated gas flow therefrom. The diverters 52 direct heated gas flow from the gas generators 42 into the lift fan 44 and/or the power turbines 54. Specifically, the diverters 52 are selectable between an open position wherein the diverters allow generally all of the heated gas flow from the gas generators 42 to flow into the lift fan 44, and a closed position wherein the diverters allow generally all of the heated gas flow from the gas generators to flow into the power turbines 54. In one embodiment, the diverters 52 are selectable to a position wherein the diverters direct a portion of the heated gas flow from the gas generators 42 into the lift fan and a portion into the power turbines 54. Although two diverters 52 and two power turbines 54 are shown in FIG. 2, the lift system 24 may include any number of diverters and any number of power turbines without departing from the scope of the present invention.

The electrical power generated by the power turbines 54 may be used for the aircraft 20, for example to power a generator (not shown), a hydraulic pump (not shown), and/or an environmental control system onboard the aircraft. The electrical power generated by the power turbines 54 may also be used to power other aircraft (not shown) and/or ground facilities (not shown). By generating electrical power from the lift system 24, and more specifically the gas generators 42, the aircraft 20 can generate electrical power without running the engines 26. Accordingly, operation of the engines 26 may be reduced thereby possibly reducing a frequency of engine maintenance and/or overhaul. Additionally, hazards to ground personnel associated with operation of the engines 26 when the aircraft 20 is on the ground may be reduced.

Although the invention is herein described and illustrated in association with an aircraft, it should be understood that the present invention is generally applicable to generating lift for any vehicle. Accordingly, practice of the present invention is not limited to aircraft, nor is practice of the present invention limited to any specific aircraft described and/or illustrated herein.

Exemplary embodiments of lift systems and methods are described above in detail. The methods and systems are not limited to the specific embodiments described herein, but rather, components of each system may be utilized independently and separately from other components described herein, and steps of each method may be utilized independently and separately from other steps described herein. Each lift system component can also be used in combination with other lift system components. Additionally, each method step can also be used in combination with other method steps.

When introducing elements of the present invention or the preferred embodiment(s) thereof, the articles "a", "an", "the" and "said" are intended to mean that there are one or more of the elements. The term "plurality" is intended to mean there are two or more of the corresponding elements. The term "multiplicity" is intended to mean that there are three or more of the corresponding elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A method of generating lift for an aircraft, said method comprising:
    heating a flow of gas using a gas generator mounted on the aircraft that contributes no more than about ten percent of thrust used to propel the aircraft in a forward direction;
    driving a lift fan using the heated gas flow to generate lift for the aircraft; and
    directing at least a portion of the heated gas exiting the lift fan over a wing control surface of the aircraft, including directing at least a portion of the heated gas over an internally blown flap (IBF) of the aircraft.

2. A method in accordance with claim 1 further comprising directing at least a portion of gas exiting the lift fan into an internal compartment of the vehicle.

3. A method in accordance with claim 1 wherein at least a portion of the heated gas flow exits the lift fan and mixes with air exiting the lift fan.

4. A method in accordance with claim 1 further comprising generating electrical power using at least a portion of the heated gas flow from the gas generator.

5. A method in accordance with claim 1 further comprising further heating the heated gas flow downstream from the gas generator.

6. An airframe comprising:
    a body;
    a wing coupled to the body;
    a gas generator mounted on the body for heating a flow of gas, said gas generator contributing no more than about ten percent of thrust used to propel the body in a forward direction;
    a lift fan mounted on the body for generating lift for the body, said lift fan being fluidically coupled with the gas generator for driving the lift fan from at least a portion of the heated gas flow; and
    an internally blown flap mounted on the wing for affecting an aerodynamic property of at least a portion of the wing, said lift fan being positioned on the body to direct at least a portion of the heated gas exiting the lift fan over the internally blown flap.

7. An airframe in accordance with claim 6 further comprising a duct mounted on the body and positioned to receive the heated gas flow exiting the lift fan and divert the heated gas flow over a compartment opening of the airframe as an air curtain.

8. An airframe in accordance with claim 6 wherein at least a portion of the heated gas flow exits the lift fan and mixes with air exiting the lift fan.

9. An airframe in accordance with claim 6 wherein the lift fan comprises an axial fan.

10. An airframe in accordance with claim 6 wherein the lift fan comprises a centrifugal compressor.

11. An airframe in accordance with claim 6 further comprising a duct mounted on the body and positioned to receive gas exiting the lift fan and direct the received gas into an internal compartment of the body.

12. An airframe in accordance with claim 6 further comprising an augmenter operably connected between the gas generator and the lift fan for heating the heated gas flow downstream from the gas generator.

13. An airframe in accordance with claim 6 further comprising a diverter operably connected between the lift fan and the gas generator for directing at least a portion of the heated gas flow into the lift fan.

14. An airframe in accordance with claim 13 further comprising a power turbine mounted on the body for generating electrical power and being fluidically coupled with the gas generator, said diverter being operably connected between the gas generator and the power turbine for directing at least a portion of the heated gas flow from the gas generator into the power turbine.

15. An aircraft comprising:
    a frame;
    a wing coupled to the frame;
    an engine mounted on the frame for propelling the aircraft in a forward direction;
    a gas generator mounted on the frame for heating a flow of gas, said gas generator contributing no more than about ten percent of thrust used to propel the aircraft in the forward direction; and
    a lift fan mounted on the frame for generating lift for the aircraft, said lift fan being fluidically coupled with the gas generator for driving the lift fan from at least a portion of the heated gas flow; and
    an internally blown flap mounted on the wing for affecting an aerodynamic property of at least a portion of the wing, said lift fan being positioned on the body to direct at least a portion of the heated gas exiting the lift fan over the internally blown flap.

16. An aircraft in accordance with claim 15 further comprising a duct mounted on the body and positioned to receive the heated gas flow exiting the lift fan and divert the heated gas flow over a compartment opening of the aircraft as an air curtain.

17. An aircraft in accordance with claim 15 wherein at least a portion of the heated gas flow exits the lift fan and mixes with air exiting the lift fan.

18. An aircraft in accordance with claim 15 wherein the lift fan comprises an axial fan.

19. An aircraft in accordance with claim 15 wherein the lift fan comprises a centrifugal compressor.

20. An aircraft in accordance with claim 15 further comprising a duct mounted on the frame and positioned to receive gas exiting the lift fan and direct the received gas into an internal compartment of the vehicle.

21. An aircraft in accordance with claim 15 further comprising an augmenter operably connected between the gas generator and the lift fan for heating the heated gas flow downstream from the gas generator.

22. An aircraft in accordance with claim 15 further comprising a diverter operably connected between the lift fan and the gas generator for directing at least a portion of the heated gas flow into the lift fan.

23. An aircraft in accordance with claim 15 further comprising a power turbine mounted on the frame for generating electrical power, said diverter being operably connected between the gas generator and the power turbine for directing at least a portion of the heated gas flow from the gas generator into the power turbine.

\* \* \* \* \*